United States Patent Office 3,690,936
Patented Sept. 12, 1972

3,690,936
ADHESIVE MATERIAL FOR BONDING VINYL
CHLORIDE POLYMERS TO SUBSTRATES
Richard C. Doss and Faber B. Jones, Bartlesville, Okla.,
assignors to Phillips Petroleum Company
No Drawing. Filed Feb. 2, 1970, Ser. No. 8,074
Int. Cl. C09j 7/02
U.S. Cl. 117—122 H       4 Claims

ABSTRACT OF THE DISCLOSURE

Film materials of vinyl chloride polymers are contacted with a solution or dispersion of a dry-film forming, heat-activatable adhesive material comprising a blend of an ethylene-vinyl acetate copolymer, a polyamide, and a tackifier; dry adhesive coated film is thereafter heat activated and bonded to substrates.

BACKGROUND OF THE INVENTION

Sheet and film products of polymers of vinyl chloride, such as polyvinyl chloride (PVC), have enjoyed wide use in various industries in the formation of a variety of laminated structures. It is well known that in order to form a durable laminate the film and substrate must be firmly bonded with a suitable adhesive material. Such adhesive materials are, of course, commercially available, but their use in industry presents certain problems which render the adhesive materials especially inconvenient in application.

A number of the known adhesive materials which do develop adequate strength characteristics suitable for laminating, inherently require that the lamination step be undertaken while the adhesive is wet. The requirement that these adhesive materials be wet at the time of lamination in order to develop adhesive properties presents several problems to the user. In brief, these problems revolve about the basic requirement that preparation of the adhesive material, application of it to the film or substrate, and lamination of the film and substrate must be conducted in immediate succession. This basic requirement presents the additional problem of handling wet films in commercial quantities. There is also presented the problem of timing, in that there cannot be untimely delay involved in the various handling steps between preparing and applying the adhesive material and laminating the film and substrate. It is obvious, of course, that the requirement for wet application of the adhesive material virtually precludes the user from storing, for example, an inventory of adhesive coated film for lamination at some future time.

When the substrate is flat the process of laminating under wet conditions, while being difficult as above described, is not nearly so difficult as when the substrate has a highly contoured surface. It is axiomatic that film and substrate must be in firm contact in all places where a durable laminate is desired in order for the adhesive material to perform as designed. Where the substrate is flat the requisite firm contact can be conveniently achieved by, for example, the direct application of pressure such as by pressure rolls or a press and the like. However, where the substrate is not flat, but instead curved or highly contoured the direct application of pressure is not convenient. Accordingly, a special bonding process, vacuum form bonding, has developed in the art to facilitate the lamination of contoured substrates with, for example, vinyl chloride based film products. Vacuum form bonding does provide a technique for developing the necessary firm contact. In brief, the process of vacuum form bonding involves heating the film to a temperature at which the film softens, then applying the softened film to the substrate by means of a low pressure established between the film and the substrate. The low pressure creates a pressure drop across the film which, due to its softened condition, the film cannot resist, and it is, therefore, driven against the surface of the substrate to thereby establish the necessary firm contact. The problems associated with vacuum form bonding are compounded when the adhesive material must be handled wet, and they are further compounded when the surface of the substrate is highly contoured.

In view of the problems discussed above it would be highly desirable, especially from a manufacturing point of view, to have an adhesive system which would enable application of an adhesive material in liquid form to a film which could, after drying, be stored at ordinary warehouse conditions and then, after a period of storage, be removed from storage, be handled dry preparatory to vacuum form bonding, and then be heat activated during the heating step of the vacuum forming and still form a durable laminate. Such a dry-coated film would be highly useful in that it would enable a manufacturer to retain an inventory of adhesive-backed film of perhaps various designs and colors for a period of time prior to lamination. Such a film would lend a flexibility to film laminating not heretofore known. The requirements of such an adhesive system would be that the adhesive be easily applied by conventional liquid applicators, quickly dried, readily stored under warehouse conditions without loss of adhesive properties and without sticking to undesired surfaces, conveniently handled, easily bonded to flat and contoured substrates by conventional means, and sufficiently strong to resist the processing strains present prior to, during, and subsequent to lamination.

THE INVENTION

It is thus an object of this invention to provide a novel adhesive material for vinyl chloride polymers.

Another object of this invention is to provide a novel vinyl chloride adhesive film particularly suitable for vacuum form bonding.

A further object of this invention is to provide a laminated article having an improved adhesive system therein.

A still further object of this invention is to provide a process for bonding a film of vinyl chloride polymer to a substrate.

Other aspects, objects, and the several advantages of this invention will be apparent to one skilled in the art from the following disclosure examples and claims.

We have discovered that a novel adhesive material for vinyl chloride polymers is produced when an ethylene-vinyl acetate copolymer, a polyamide, and a tackifier are blended together in such proportions that the weight ratio of ethylene-vinyl acetate copolymer to polyamide to tackifier is in the range of 1:0.4:0.2 to 1:1.6:2.4 and preferably in the range of 1:0.8:0.8 to 1:1.2:1.6. When this adhesive material is dissolved in a suitable solvent or dispersant, the resulting solution or dispersion applied to one side of a vinyl chloride polymer film material, and the solution or dispersion allowed to form a dry coating on the film there is produced a dry, storable, heat activatable adhesive film. The dry coating, being the adhesive material, is an intimate blend of mutually nonreactive components which are the above mentioned ethylene-vinyl acetate copolymer, polyamide, and tackifier. The dry adhesive film, due to the nonreactive nature of the components of the dry coating, is storable for a period of time of at least six months and up to 12 months or more prior to heat activation with satisfactory retention of adhesive characteristics.

The copolymer of ethylene and vinyl acetate useful herein is a high molecular weight ethylene-based resin wherein 20 to 45, preferably 27 to 42, weight percent of the copolymer is derived from vinyl acetate.

The preparation of ethylene-vinyl acetate copolymers is well known by those skilled in the art, and such copolymers are also commercially available. Examples of commercially available ethylene-vinyl acetate copolymers are those available under the trademarks Elvax, Aircoflex, Zetafax, and Ultrathene.

The ethylene-vinyl acetate copolymer preferred for use herein has a vinyl acetate content in the range of 32 to 34 percent by weight of the copolymer, and a melt index of 22–28 grams per 10 minutes according to ASTM D 1238. This copolymer is commercially available as Elvax 150.

The polyamides useful herein are polymers derived from the condensation of polycarboxylic acids with polyamines. The polycarboxylic acids have 2 to 6 carboxyl groups, preferably 2 or 3 carboxyl groups, and the polyamines have 2 to 6 amino groups, preferably 2 or 3 amino groups. The preferred polyamides are solid, chemically inert, thermoplastic copolymers of polymerized fatty acids, having about 36 to 54 carbon atoms and 2 or 3 carboxyl groups, and alkanepolyamines having 2 to 18 carbon atoms and 2 or 3 amino groups. The polymerized fatty acids preferred for use herein are those produced by polymerizing unsaturated fatty acids having at least 18 carbon atoms.

The polyamides can be prepared by methods known in the art, such as the process of U.S. 2,379,413, and they are also commercially available under various trademarks, such as Versamid, Versalon, Emery, and Pentamid.

The polyamide preferred for use herein is a high molecular weight copolymer of dimerized linoleic acid, a dicarboxylic acid containing 36 carbon atoms, and an alkylenediamine. This polyamide, which is characterized by a viscosity in the range of 12 to 18 poises at 160° C. and a softening point in the range of 105 to 115° C. (ASTM E–28), is commercially available as Versamid 940.

The tackifier useful herein is a hydrocarbon resin. The preferred hydrocarbon resin is a polyterpene resin and particularly those polyterpene resins which are polymers of beta pinene, such as that sold under the trademark Piccolyte, and polymers of alpha pinene, such as that sold under the trademark Nirez. Another polyterpene resin useful herein is commercially available under the mark Zonarez. These polyterpene resins are made in a wide range of melting points with the preferred ones having a melting point in the range of 185° to 257° F.

The preferred tackifier is a polymer of beta pinene having a melting point in the range of 233° to 244° F. This tackifier is commercially available as Piccolyte S–115.

Other hydrocarbon resin tackifiers which can be used include resinous polymerization products obtained by catalytic polymerization of mixed unsaturated monomers derived from cracked petroleum.

The solvent or dispersing medium useful herein for the ethylene-vinyl acetate copolymer, the polyamide, and tackifier can be, e.g., any of the following substances or mixtures thereof: aromatic and aliphatic hydrocarbons such as benzene, toluene, xylene, hexane, octane, naphtha, cyclohexane, and methylcyclopentane; chlorinated hydrocarbons such as methylene chloride, chloroform, carbon tetrachloride, ethylene chloride, trichloroethylene, and propyl chloride; ketones such as acetone, methyl ethyl ketone, methyl isobutyl ketone, and cyclohexanone; ethers such as diethyl ether, dipropyl ether, dibutyl ether, tetrahydrofuran, dioxane, and dimethyl ether of ethylene glycol; alcohols such as methyl alcohol, ethyl alcohol, isopropyl alcohol, butyl alcohol, isobutyl alcohol, tert-butyl alcohol, and cyclohexanol; esters such as ethyl acetate, butyl acetate, and 2-ethoxyethyl acetate; and nitriles such as acetonitrile and propionitrile. The solvent or dispersing medium is used in an amount sufficient to permit convenient application of the liquid adhesive composition solution to the film; the amount of solvent used is ordinarily in excess of 50 weight percent of the adhesive solution.

The perferred solvent or dispersing medium is a combination consisting of toluene and tert-butyl alcohol or isobutyl alcohol wherein the weight percent of alcohol present in the combination solvent is in the range of 25 to 35 percent by weight of the solvent mixture.

The adhesive solution comprising the preferred adhesive material and the preferred solvent has about 70 to 85, preferably 75 to 81, percent by weight solvent, with the remaining 30 to 15, preferably 25 to 19, percent by weight of the solution being the adhesive material.

The solution or dispersion is most conveniently applied to the film material at ambient temperature by any type of method known in the art which can be adjusted to provide a 2 to 3 mil dry film adhesive. The solvent or dispersing medium is removed prior to storage of the adhesive film. This can be accomplished by evaporation, preferably through the application of heat for 5 to 10 minutes at 135° to 160° F.

The produced dry-coated adhesive film can be stored for a period of at least 6 months and up to 12 months or more at 50–110° F. and thereafter the adhesive material can be heat activated and the film can be laminated to highly contoured surfaces by vacuum form bonding. The adhesive coated film, subsequent to drying which involves evaporation of the solvent, is not tacky at temperatures of 50–110° F.; it has substantial retention of peel strength and creep resistance, upon application to a substrate, after storage for periods of at least 6 months and up to 12 months or more; and it exhibits no blocking tendency after conditioning at 104° F. for 24 hours.

The film material which can be used herein includes, in addition to polyvinyl chloride, copolymers of vinyl chloride with other monomers such as vinyl acetate, maleates, fumarates, crotonates, acrylates, methacrylates, ethylene, propylene, and the like, wherein at least 50 percent by weight of the copolymer is derived from vinyl chloride. The thickness of the film material is not critical to the present invention and any convenient film thickness can be employed.

The dry, adhesive-coated, film material, the dry adhesive on which is capable of being heat activated, can be bonded to a variety of substrate materials such as particle board, aluminum, steel, plywood and asbestos by the application of heat to produce a film temperature in the range of 150° to 450° F., preferably 200° to 350° F., and by the application of a pressure drop between the adhesive film and the substrate. The pressure drop can be achieved by the direct application of pressure to the film such as by rolls and the like in which case the differential across the film can be in the range of about 0.2 p.s.i. to 100 p.s.i. and preferably about 10 p.s.i. Where direct pressure is used the film temperature is preferably in the range from about 200 to 330° F. The pressure drop can also be achieved by vacuum forming in which case a negative pressure is induced between the film material and the substrate. In such a situation the pressure differential across the film is, of course, limited to local ambient pressure, however, an absolute pressure in the range from about 1.0 to 12.0 p.s.i.a. induced between the film material and substrate is sufficient to provide good film to substrate contact. This absolute pressure range is equivalent to a differential pressure range across the film of about 13.7 to 2.7 p.s.i. assuming standard atmospheric pressure. Where vacuum forming is used the film temperature is preferably in the range from about 250 to 350° F.

In this specification and in the following examples and recorded results which appear hereafter there are mentioned various words, phrases, test procedures, and the like which have specific meaning in the art. However, to avoid confusion and to promote understanding the following definitions and descriptions of certain words and phases of art and of certain test procedures are given.

Vacuum-form bonding.—In the art of laminating a film, such as polyvinyl chloride and the like, to a surface (substrate) it is essential to a good bond that there be a firm contact established between the film and the substrate so that the adhesive material employed can perform as designed. When the substrate is not a flat surface, but is instead a contoured surface, a special bonding process is used because an adhesive backed film cannot be conveniently rolled on the surface to establish the essential firm contact between film and substrate. Accordingly, by the process of vacuum-form bonding the film is heated to a certain softening point at which time a negative pressure is established between the film and substrate which causes the film to be drawn onto the contoured surface. In general the more intricate the contoured surface, the hotter the film must be during the process in order to conform to the surface. Since a bonded film is under greater internal strain when the substrate is contoured than when the substrate is flat, the requirements of an adhesive material used in vacuum-form bonding to contoured surfaces are more demanding than in flat surface laminating.

Peel strength.—A measure of the bond produced by an adhesive material between a flexible film and a substrate is expressed, in general terms, as the force required to strip or peel the adhering film from the substrate. This force, called peel strength, is reported as the average load in pounds (force) per unit width in inches of bond line, i.e., pounds per inch of width (p.p.i.w.), required to progressively separate the adhering film from the substrate at a separation angle of approximately 180° and at a separation rate of six inches per minute. The procedure employed for determining peel strength is fully set out in ASTM Standard Method of Test designated D903-49 and this method was used except for such changes as may hereinafter become apparent.

All samples prepared herein for determination of peel strength were prepared according to the following basic procedure: Each peel strength test specimen comprised a 1-inch wide by 10-inch long piece of polyvinyl chloride woodgrain film bonded to a 1-inch wide by 8-inch long by ¾-inch thick piece of flat particle board substrate, such that 5 inches of film were bonded to the particle board thus leaving 3 inches of board and 5 inches of film free for clamping in the test apparatus. All peel strength specimens were prepared in groups of four as follows.

A homogeneous solution of a given amount of adhesive mixture in a given amount of solvent was spread over the center portion of the backside of a 12.0 inch by 12.0 inch by 0.008 inch flat sample of polyvinyl chloride woodgrain film. The solution was evenly spread to a uniform thickness of approximately 3.64 mils and its covered an area of approximately 8.0 inches by 10.0 inches. The solution-wet film was then placed in a forced-air oven maintained at approximately 158° F. for a sufficient length of time to evaporate the solvent and thus leave a dry coating comprising the adhesive mixture affixed to the backside of the film. The solvent evaporation time consumed 5 to 10 minutes. Since the object of the experimentation was to produce a dry, storable, heat activatable film which would retain satisfactory adhesive characteristics after a period of storage at ambient temperature, the above described dry coated film immediately after solvent removal was placed in storage at 75° F. for 1 day prior to the bonding step.

After the given storage (conditioning) period the film was vacuum-form bonded to an 8.0 inch by 5.0 inch by 0.75 inch piece of flat particle board as follows.

The dry coated 12.0 inch by 12.0 inch film was clamped in a 12.0 inch by 12.0 inch frame. The framed film was then placed over the open top of a 12.0 inch by 12.0 inch by 5.0 inch box with the coated side of the film facing the interior of the box. The box containing the above mentioned particle board which was lying in the bottom of the box and placed opposite the coated side of the frame film which was secured to the open top of the box. The box also contained a small outlet in one side, which was connected by suitable means to the suction side of a vacuum pump which was used to create a negative pressure with respect to ambient of about 1-10 p.s.i.a. within the box to thus facilitate the subsequent draw-down of the heat softened/activated film over the surface of the particle board. A heater was positioned approximately 5.0 inches above the film in such a manner that it could be removed at will. The heater was an integral part of a vacuum forming unit (Auto-Vac, Vacuum Forming Machine, Model LV). A piece of 32-ounce cotton duck cloth (12.0 inches by 12.0 inches by 0.080 inch) and a doubled piece (12.0 inches by 12.0 inches) of 17 mesh stainless steel screen were placed immediately over the film to moderate the intense heat emitted by the heater. Heat was applied to this complete assembly for approximately 2½ minutes and the film was heated to a temperature in the range of about 300-325° F. before vacuum was applied. The heat was continued for about 10-15 seconds after the vacuum was first applied. The vacuum draw-down was then continued for about 30-45 seconds after heating was ceased to thus produce a total time of vacuum application in the range of about 40 to 60 seconds. The vacuum was then released and thereafter cool air was passed over the laminated surface to reduce the film temperature to ambient (75° F.).

The laminated assembly was then stored (conditioned) for a full day (24 hours) at 75° F. before further experimentation was undertaken. At the end of this conditioning period the above described peel strength test specimens were prepared from the above described laminated assembly. As previously mentioned, four test specimens of the specified dimensions were cut from the laminated assembly and all four were subjected to peel strength tests at approximately 75° F. on an Instron Model TT at a crosshead speed of 12 inches per minute. The reported peel strength for the laminated assembly is the average peel strength of the four test specimens prepared from the assembly.

Creep resistance.—Another measure of the bond strength of an adhesive material is its ability to resist alteration in bonded dimensions as a result of various factors, two of which include temperature and time. When polyvinyl chloride film is bonded to a substrate, especially those having a highly contoured surface, considerable strain is introduced into the film. As the laminated assembly (film-adhesive-substrate) is subjected to environmental temperature, e.g., 50 to 140° F., the bonded film tends to relax. The tendency to relax, that is, the elastic memory, increases with temperature so that more bonding strength, creep resistance, is required from the adhesive system in order to overcome this internal elastic stress.

It is interesting to note that when the adhesive backed polyvinyl chloride film is heated above about 350° F. it loses its elastic memory which means that the strength properties (creep resistance) of the adhesive material can be reduced if the film is heat activated above about 350° F. However, since the test specimens employed herein involved polyvinyl chloride woodgrain film the heat activation temperatures were limited to film temperatures of 275-325° F. This temperature limitation is based solely on the fact that above 350° F. the matte finish of the polyvinyl chloride film glazes and loses its woodgrain appearance. The temperature limitation does not limit the adhesive activation temperature which can be in excess of 350° F. and up to 450° F.

Creep resistance measurements herein were made as follows: A 12.0 inch by 12.0 inch by 0.008 inch sample of polyvinyl chloride woodgrain film was dry coated with adhesive material in preparation for vacuum forming in exactly the same manner as described above under the discussion pertaining to peel strength.

After a storage (conditioning) period of one day the film was vacuum-form bonded to a substrate utilizing a vacuum forming procedure similar to that described above under the discussion pertaining to peel strength. Actually the only difference between the two procedures was in the configuration of the substrate. In order to test for creep resistance a special particle board was designed to represent the most severe contours expected to be encountered in commercial vacuum-form bonding operations. This special substrate was 5⅝ inches long by 5.0 inches wide by 1.0 inch thick having a flat bottom and a "waffle-like" top surface. As the "waffle-like" description suggests, the top surface was crisscrossed with V notches. There were five different type notches each differing from the others by its particular combination of notch depth and notch angle. The top edge of the entire periphery of the substrate was chamfered at a 45° angle. The chamfer extended to a depth of ¼ inch beneath the top surface of the substrate. Perpendicular to the length dimension and running from one side to the other side parallel to the width dimension were three notches; also perpendicular to the width dimension and running from one side to the other side parallel to the length dimension were three more notches. This combination of chamfers and intersecting notches thus produced a top surface plane consisting of 16 rectangular flat surfaces of varying dimensions each one surrounded by nonperpendicular sides. Spaced holes 0.04 inch in diameter were drilled in the bottom of the notches in order to assist the draw-down during vacuum forming.

Subsequent to vacuum-form bonding the film to the special substrate, the laminated assembly was stored for 24 hours at 75° F. After the storage period the laminated assembly was then placed in an oven maintained at a given temperature. If the film continued to be at least 90 percent bonded to the notches for a period of 10 days at the given temperature, the creep resistance of the adhesive mixture was considered "good." If the film continued to be at least 75 percent but less than 90 percent bonded to the notches for a period of 10 days at the given temperature, the creep resistance of the adhesive mixture was considered "fair." If the film lifted from the notches within 24 hours at the given temperature, the creep resistance of the adhesive mixture was considered "poor."

Blocking.—As defined herein the term "blocking" is intended to mean the adhesion between touching layers of material such as occurs under moderate pressures during storage or use wherein one touching face is an adhesive material and the face touched is a nonadhesive material. Specimens employed herein for use in the blocking test were prepared as follows. Six test specimens, each one being 1.5 inches by 1.5 inches by 0.008 inch were cut from a suitably large sample of adhesive coated polyvinyl chloride woodgrain film. The sample of film was adhesive coated in exactly the manner described above in the discussion pertaining to peel strength. The prepared film was conditioned at 75° F. for 24 hours following the solvent removal step. After conditioning the above mentioned six test specimens were cut from the film. The six test specimens were divided into three groups of two. The two specimens in each group were stacked such that the adhesive face on each one faced down (the adhesive faces did not touch). Each of the three groups of stacked specimens were placed, adhesive face down, on a steel plate, each plate being 1.5 inches by 1.5 inches, the specimens and plates were aligned so that the edges were flush and a 1 pound weight having a flat base 1 square inch in area was placed on each one of the specimen stacks. The prepared specimens were transferred to an oven maintained at 104° F. and conditioned at that temperature for a period of 24 hours. At the end of the period the test specimens were separated. If the test specimens could be separated without sticking to one another, the adhesive was considered to have "no blocking tendency." If the test specimens did stick together but could be separated without any transfer or damage to either surface the adhesive was considered to have a "slight blocking tendency." If the test specimens did stick together and could not be separated without damage to either surface or transfer of the adhesive from one surface to the other the adhesive was considered to have a "severe blocking tendency."

An adhesive meriting a given blocking tendency rating after the 24 hour conditioning at 104° F. will not exhibit a further blocking tendency if the period of storage is greater than 24 hours. This is especially true where the longer period of storage is at temperatures below 104° F.

EXAMPLES

Several different adhesive compositions were prepared and tested for peel strength, creep resistance, and blocking. The specific test procedures employed are described above in the discussions pertaining to peel strength, creep resistance, blocking and vacuum form bonding. The specific contents of 14 different adhesive compositions tested are given in Table 1, below, in Examples 1 through 14. The test results obtained for each of the 14 adhesive compositions tested are also given in Table 1, and the reported results for each composition corresponds with the appropriate example number.

In Examples 1 through 14, several commercially available compounds were employed. The following list provides information pertinent to the commercial compounds which were actually used herein.

(I) Elvax, high molecular weight ethylene-vinyl acetate copolymer, supplied by Du Pont.

| Grade | Melt index | Percent vinyl acetate |
|---|---|---|
| Elvax 40 | 45–70 | 39–42 |
| Elvax 150 | 22–28 | 32–34 |
| Elvax 260 | 5–7 | 27–29 |

(II) Versamid, polyamide resin; Versalon, polyamide resin both supplied by General Mills, Inc. Emery 3796–R, polyamide resin supplied by Emery Industries, Inc.

Versamid 940 is a hard, chemically inert, thermoplastic polyamide resin product. It has a viscosity of 12 to 18 poises at 160° C., a softening point of 105 to 115° C. (ASTM E–28), and a specific gravity of 0.98 at 25°/25° C.

Versalon 1112 is a hard, chemically inert, thermoplastic polyamide resin product. It has a viscosity of 30 to 40 poises at 190° C., a softening point of 105 to 115° C. (ASTM E–28–58T), and a specific gravity of 0.955 (ASTM D–570–59a T).

Emery 3796–R is a high molecular weight, stable, thermoplastic polyamide resin product having a viscosity of 110 poises at 190° C., and a softening point of 108° C. (ASTM E28–58T).

(III) Piccolyte, terpene polymer resin, supplied by Pennsylvania Industrial Chemical Corporation.

Piccolyte S–115 is a solid, chemically inert thermoplastic terpene resin composed essentially of polymers of pinenes, predominately beta pinene. It has a molecular weight of about 1200, a softening point of 115° C. and a specific gravity of 0.98 at 15° C.

Examples 1 through 8 inclusive illustrate adhesive blends wherein ethylene-vinyl acetate copolymer, a polyamide and a polyterpene tackifier are present together in each blend. Accordingly, Examples 1 through 8 inclusive do illustrate adhesive blends within the scope of this invention. Examples 9 through 14 inclusive illustrate adhesive blends wherein ethylene-vinyl acetate copolymer, a polyamide and a polyterpene tackifier are not present together in each blend. Accordingly, Examples 9 through 14 inclusive do not illustrate adhesive blends within the scope of this invention. It will be noted from Table 1 that the adhesive materials used in Examples 9 through 14 were the same as those used in Examples 1 through 8 to thus provide basis for comparison of the adhesive materials when used as adhesives both within and without the scope of this invention. The results clearly show that, with respect to peel strength, the adhesive blends of this invention are clearly superior to the individual materials themselves, either standing alone or in blends not within the scope of the invention.

The results also show that, with respect to creep resistance, the adhesive blends of this invention perform satisfactorily under conditions likely to be encountered by laminated articles produced in commercial vacuum form bonding operations.

2. The adhesive film of claim 1 wherein said ethylene-vinyl acetate copolymer is a high molecular weight ethylene based resin having a vinyl acetate content in the range of 20 to 45 percent by weight of said copolymer, and said polyamide is a solid, thermoplastic copolymer of a polymerized fatty acid having 36 to 54 carbon atoms and 2 to 6 carboxyl groups, and an alkanepolyamine having 2 to 18 carbon atoms and 2 to 6 amino groups.

3. The adhesive film of claim 2 wherein said hydro-

TABLE 1.—PERFORMANCE PROPERTIES OF ADHESIVE MATERIAL

| Example No. | Adhesive material A Ethylene-vinyl acetate copolymer Type | Gms. | B Polyamide Type | Gms. | C Piccolyte S-115, gms. | Wt. ratio, A:B:C | Solvent system Toluene, gms. | t-Butyl alcohol, gms. | Wt. percent t-butyl alcohol in solvent | Percent adhesive material in adhesive solution | Vacuum-form bond properties[1] Peel strength,[2] lb./in.-width | Creep resistance (10 days) | Storage properties, blocking[3] 1 day at 104° F. |
|---|---|---|---|---|---|---|---|---|---|---|---|---|---|
| 1 | Elvax 150 | 5 | Versamid 940. | 5 | 5 | 1:1:1 | 40 | 16 | 29 | 21 | 7.0 | | No. |
| 2 | do | 5 | Versalon 1112. | 5 | 5 | 1:1:1 | 40 | 16 | 29 | 21 | 7.0 | | No. |
| 3a | do | 5 | Versamid 940. | 5 | 5 | 1:1:1 | 40 | [4]16 | [4]29 | 21 | 6.5 | Good at 77° F | |
| 3b | do | 5 | do | 5 | 5 | 1:1:1 | 40 | [4]16 | [4]29 | 21 | 6.5 | Good at 122° F | |
| 3c | do | 5 | do | 5 | 5 | 1:1:1 | 40 | [4]16 | [4]29 | 21 | 6.5 | Fair at 140° F | |
| 4 | Elvax 40 | 5 | Versamid 940. | 5 | 5 | 1:1:1 | 40 | 16 | 29 | 21 | 5.5 | | No. |
| 5 | do | 5 | Versalon 1112. | 5 | 3 | 1:1:0.6 | 40 | 16 | 29 | 19 | 5.0 | | No. |
| 6 | Elvax 260 | 5 | do | 5 | 3 | 1:1:0.6 | 40 | 16 | 29 | 19 | 3.1 | | No. |
| 7 | Elvax 40 | 5 | Emery 3796R. | 5 | 1 | 1:1:0.2 | 40 | 16 | 29 | 16 | 3.0 | | No. |
| 8 | Elvax 260 | 5 | Versamid 940. | 5 | 7 | 1:1:1.4 | 40 | 0 | 0 | 30 | 3.0 | | No. |
| 9 | Elvax 150 | 5 | do | 5 | 0 | 1:1:0 | 40 | 16 | 29 | 15 | 1.5 | | No. |
| 10 | Elvax 40 | 8.7 | | 0 | 0 | 1:0:0 | 41 | 0 | 0 | 17 | 1.0 | | No. |
| 11 | | 0 | Versamid 940. | 15 | 10 | 0:3:2 | 35 | [5]35 | [5]50 | 26 | 0.4 | | No. |
| 12 | | 0 | Versalon 1112. | 25 | 0 | 0:1:0 | 35 | [5]35 | [5]50 | 26 | 0.2 | | No. |
| 13 | | 0 | do | 10 | 15 | 0:2:3 | 35 | [5]35 | [5]50 | 26 | 0.2 | | No. |
| 14 | | 0 | Versamid 940. | 25 | 0 | 0:1:0 | 35 | [5]35 | [5]50 | 26 | 0.1 | | No. |

[1] Vacuum form properties were determined by experimenting with polyvinyl chloride woodgrain film bonded to flat (peel strength) and contoured (creep resistance) particle board.
[2] Prior to vacuum forming the dry coated film was conditioned at 75° F. for 1 day.
[3] Prior to stacking the test specimens were conditioned at 75° F. for 1 day.
[4] Isobutyl alcohol employed instead of t-butyl alcohol.
[5] Isopropyl alcohol employed instead of t-butyl alcohol.

Reasonable variations and modifications, which will be apparent to those skilled in the art, can be made in this invention without departing from the spirit or scope thereof.

We claim:

1. A dry, storable, heat activatable adhesive film comprising an adhesive material in combination with a film material wherein said adhesive material is affixed to said film material in the form of a dry coating, said dry coating being a blend of components consisting essentially of an ethylene-vinyl acetate copolymer, a polyamide and a hydrocarbon resin tackifier, said components being present in said blend in such proportions that the weight ratio of ethylene-vinyl acetate copolymer to polyamide to tackifier is in the range of 1:0.4:0.2 to 1:1.6:2.4 and wherein said film material comprises a vinyl chloride based polymer wherein said vinyl chloride member is present in the range from about 50 to 100 percent by weight of said polymer.

carbon resin tackifier is a polyterpene resin polymer of beta pinene.

4. The adhesive film of claim 3 wherein said film material is polyvinyl chloride.

References Cited

UNITED STATES PATENTS

| 3,448,178 | 6/1969 | Flanagan | 260—23 X |
| 3,377,305 | 4/1968 | House | 260—28.5 X |
| 3,262,808 | 7/1966 | Crooks et al. | 117—122 UX |
| 2,469,108 | 5/1949 | Fries | 260—23 |

WILLIAM D. MARTIN, Primary Examiner

B. D. PIANALTO, Assistant Examiner

U.S. Cl. X.R.

117—161 P; 260— 23 H, 28.5 AV